June 17, 1930. R. KAEMPF ET AL 1,765,161

CASK, BARREL, OR LIKE CONTAINER

Filed Oct. 15, 1927

Inventors
Roman Kaempf and Antoni Lankoff
by S. LeRoi, attorney

Patented June 17, 1930

1,765,161

UNITED STATES PATENT OFFICE

ROMAN KAEMPF, OF NAWOJOWA, AND ANTONI LANKOFF, OF LWOW, POLAND

CASK, BARREL, OR LIKE CONTAINER

Application filed October 15, 1927, Serial No. 226,487, and in Poland July 13, 1926.

The subject of the present invention is a machine for the manufacture of casks having one seam or joint, according to a process previously proposed by one of the applicants and which consists in sawing concentric conical casings or sheaths out of a round block of wood having a wedge-shaped piece cut out of it, the edges of which casings are then forced together by means of hoops placed over the casings so as to meet and form the seam or joint of the cask casing.

The essential feature of the machine according to the invention is constituted by the special sequence of manufacturing operations performed by it, which consists in gripping a round block of wood by means of clamping bolts having hemispherical ends in such manner that it can be rotated and that its longitudinal axis can be adjusted so as to lie at any desired small angle of inclination to the vertical, whilst a saw frame provided with a large number of parallel saws is moved vertically up and down and in so doing saws conical concentric cask casings out of the rotating block. In order to render it possible to adjust the longitudinal axis of the block to any desired angles of inclination to the vertical, the upper clamping bolt, provided with a hemispherical end, which clamping bolt presses on the upper end surface of the block through the medium of a metal disc, is arranged in a horizontally displaceable slide. In this way the said axis of the block can be adjusted as desired with regard to the vertical. The lower clamping bolt, which likewise operates on the lower end surface of the block through the medium of a metal disc, is coupled to this latter in such manner that the rotating clamping bolt communicates its rotary motion to the wood block through the agency of the coupling. The drive of the said clamping bolt may either be automatic and may be effected by means of a toothed wheel transmission gear or it may be dependent on the common drive for the saw frame, for instance, through the agency of the known crank pawl mechanism.

In order to render possible as advantageous a cooperation as possible of the rotated block with the saw frame, the saws of the said frame are, according to the invention, arranged in such manner, that their surfaces are perpendicular to the surfaces of the external saw frame. In view of the fact that in the cutting of conical concentric casings, flat saws cause too great a loss of wood and give rise to deviations, saws are used according to the invention, the cross section of which is curved and not straight. The whole is mounted in such a manner that the mechanism serving for the rotation of the inclined wood block and also the mechanism of the saw frame are suitably arranged between the flat side walls of the machine, which side walls are connected with one another by suitable reinforcing members. These side walls also have arranged on them the bearings necessary for the rotating parts and the guides for the rectilineally moving parts.

One constructional form according to the invention is illustrated by way of example in the accompanying drawings in which.

Figure 4:
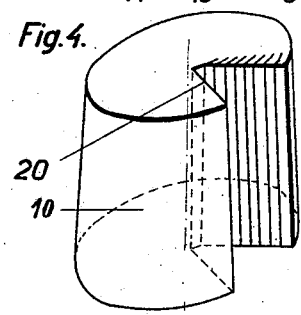
Fig. 4 is a perspective view of the block of wood at the beginning of the working operation.
Figure 5:
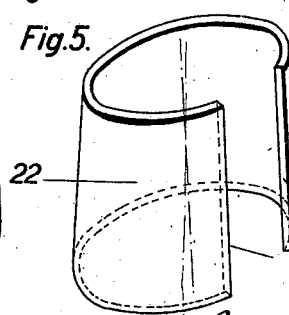
Fig. 5 is a perspective view of the cask casing.

In order to render the mode of operation of the machine clear, the manufacturing process which has to be employed has been roughly indicated in Figs. 4 and 5. The round block of wood 10 is first provided with a wedge-shaped incision 20 and then concentric conical cask casings of the kind indicated in Fig. 5 are sawn out of it, the edges 23 of which casings form the seam of the cask which is rendered tight by the application of hoops to the exterior of the casing.

The machine proper consists of the vertical side walls 1 which are provided with the vertical saw frame guides 2, 2'. The said saw frame consists of an upper transverse joist 3 and a lower transverse joist 3', said joists being spaced apart from one another at a definite distance by means of vertical struts 4. The frame 3, 4, 3' formed in this way is reciprocated in the vertical guides 2, 2' by means of crank rods 5, the upper eyelet bearings of which enclose the correspondingly shaped end pins of the upper transverse joist 3. The lower eyelet bearings of the crank rods 5 engage with the pins of the crank discs 7, which latter are keyed to a horizontal shaft which is driven in known manner by a belt by means of fast and loose pulleys 8. Between the upper transverse joist 3 and the lower joist 3' the saw blades 9 are mounted which serve for the cutting out of the conical casings from the block of wood, 10.

Figure 1:
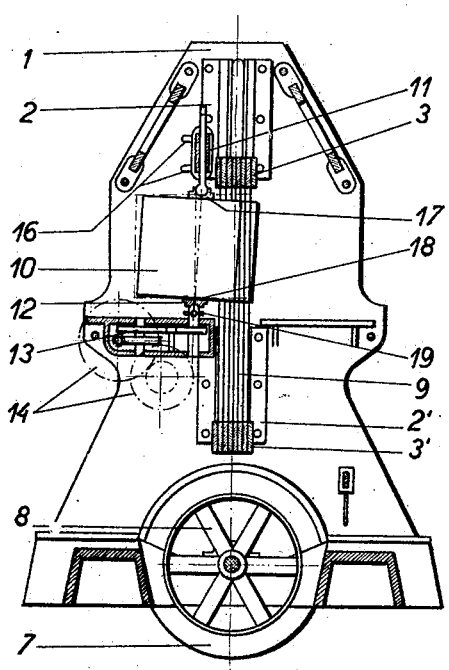
Fig. 1 is a side elevation, partly in section, of a machine according to the invention, after the removal of one of the side walls.
Figure 2:
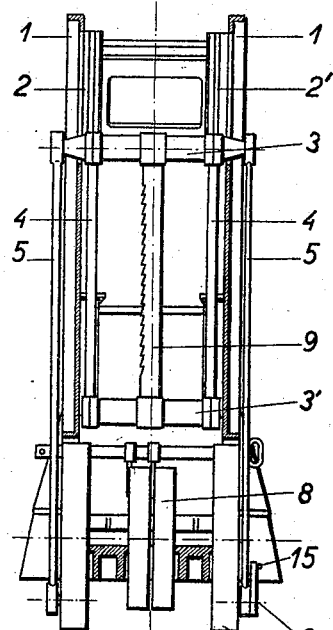
Fig. 2 is a front elevation, partly in section, on the axis of symmetry of the machine.
Figure 3:
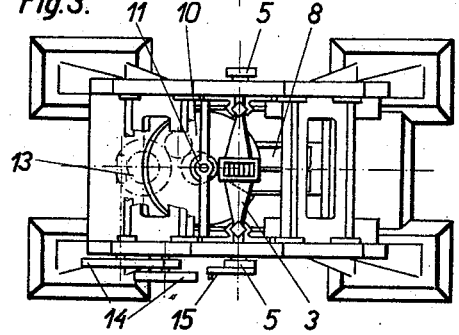
Fig. 3 is a plan of the machine.
Figure 6:
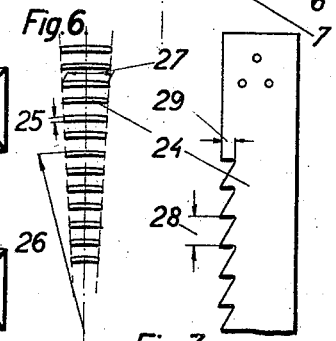
Fig. 6 shows the cross section of a plurality of assembled saws.
Figure 7:
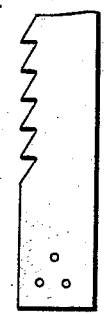
Fig. 7 is a side view of one of the saws.

In order to render it possible to cut out circular cask casings saw blades of circularly curved cross section are used in place of those of flat cross-section. The saw blades shown separately in Figs. 6 and 7 have radii of curvature 26 corresponding to their respective curvatures, which are different for each saw blade, since each saw blade is curved in accordance with its distance from the axis of rotation of the wood block. The breadths 27 of the saw blades, likewise increase from the interior towards the exterior. The lengths 28 of the teeth, the depths 29 of the teeth and also the thickness 25 of the saw blades are calculated for each of the saw blades 24 individually in such manner that as favourable a cutting feed as possible is obtained with the minimum loss of wood and without the slightest deviation of the surface of the saw blade.

A plurality of saw blades of this form is fixed in known manner between the transverse joists 3 and 3' of the saw frame in such a way that the surfaces of the blades are parallel to one another and assume a position in which they are all perpendicular to the side walls 1.

In proximity to the upper guide 2 horizontal slots 16 are provided in the two side walls 1, which slots serve for guiding a transverse joist 11. This latter is provided with a vertical clamping bolt the hemispherical lower end of which passes into a corresponding hollow of the metal plate 17 which presses on the upper end surface of the wood block 10. Against the lower end surface of the said block a metal plate 18 likewise rests, into the hemispherical hollow of which the hemispherical end of the lower clamping bolt 12 passes. The plate 18 is provided with projections 19 and the bolt 12 is likewise provided with projections constructed in such a manner that the clamping bolt 12 is enabled to rotate the plate 18 whilst at the same time not preventing this latter from assuming a position other than a horizontal one. By displacement of the upper transverse joist 11 in the lateral horizontal slots 16, it is possible, as will be seen, to give the wood block 10 any desired position of inclination to the vertical. In this way it is possible to cut out conical cask casings of any desired angle of inclination, the rotary movement of the lower clamping bolt 12 being transmitted in known manner by means of the projections 19 to the plate 18 through the medium of small recesses formed in said plate and from this latter to the wood block 10.

The clamping bolt 12 is rotated by means of a worm or toothed gear drive 13, 14 which latter may be driven either separately from a separate motor or from the common drive of the saw frame. In the latter case one of the crank pins, for instance 6, is provided with a suitable crank arm having a pin 15 which arm serves on its part for driving a crank pawl mechanism of the type known per se. This latter mechanism rotates one of the wheels 14 of the mechanism driving the lower clamping bolt 12 at an angular velocity which may be exactly regulated beforehand.

The machine constructed according to the invention operates in the following way:

After a wedge-shaped portion has been cut out the apex of which portion lies in proximity to the axis of the wood block, the latter is put in position between the discs 17 and 18 which are provided with suitable pointed members adapted to penetrate into the wood. The necessary angle of inclination of the conical cask casings which are to be manufactured is exactly adjusted by displacement of the upper transverse joist 11 in the slots 16. The transmission ratio of the gear 13, 14 is chosen according to the nature of the wood, the diameter of the wood block being also taken into consideration in order to obtain an exact definite peripheral cutting speed. The correct speed is obtained by suitable choice of the crank pawl gear arranged between the pin 15 and the rigid wheel 14. After the correct saw blades have been inserted and tensioned between the cross joists 3 and 3' of the saw frame, the cutting out of the conical casings can be commenced by introducing the saws in the first place into the wedge-shaped space in the wood block whereupon the latter is set in rotation as described for the purpose of performing the cutting out operation. The intermittent rotation of the block 10 takes place simultaneously with the vertical reciprocating movement of the saw frame in the slides 2 and is continued until all the cask casings are finished. The inner core of the wood block then remains between the plates 17 and 18 and is finally removed from the machine by raising the upper bolt.

We claim:

1. In a machine for the manufacture of casks, barrels and the like containers having a seam, the combination of: centering and block rotating means comprising ball and socket joint for each end of the block adjustable one laterally of the other so that the longitudinal axis of the block can be brought to any desired small angle of inclination to the vertical without hindering its capacity of rotation, a saw frame, a plurality of parallel saws arranged on said frame, and means for moving said frame up and down with said saws in contact with the block during the rotation of the latter, whereby said saws cut concentric conical cask casings out of the block during its rotation.

2. In a machine for the manufacture of casks, barrels and like containers having a seam, a combination as specified in claim 1, wherein the ball and socket joints are arranged at the upper and lower ends of the block, and wherein the upper ball and socket joint comprises in combination: a plate resting on the upper end surface of said block and provided with a hemispherical recess, a clamping bolt having a hemispherical end which is inserted in said recess and a horizontally displaceable slide in which said bolt is arranged so that the said upper ball and socket joint is displaceable laterally of the other ball and socket joint.

3. In a machine for the manufacture of casks, barrels and like containers having a seam, a combination as specified in claim 1, wherein the plurality of saws is constituted by a set of simultaneously operating saws of circularly curved cross section arranged concentrically with regard to one another and having radii of curvature, breadths, thicknesses and shapes of teeth corresponding suitably to their respective distances from said longitudinal axis, for the purpose of obtaining the most favourable feed possible with the least loss of wood and without deviation of the surfaces of said saws.

Signed at Warsaw, Poland this third day of October, 1927.

Fr. ROMAN KAEMPF.
ANTONI LANKOFF.